United States Patent
Beale et al.

(10) Patent No.: US 12,156,055 B2
(45) Date of Patent: Nov. 26, 2024

(54) COMMUNICATIONS DEVICE, INFRASTRUCTURE EQUIPMENT AND METHODS FOR QUALITY INFORMATION REPORT

(71) Applicant: Sony Group Corporation, Tokyo (JP)

(72) Inventors: Martin Warwick Beale, Basingstoke (GB); Shin Horng Wong, Basingstoke (GB); Basuki Priyanto, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 274 days.

(21) Appl. No.: 17/427,948

(22) PCT Filed: Jan. 10, 2020

(86) PCT No.: PCT/EP2020/050577
§ 371 (c)(1),
(2) Date: Aug. 3, 2021

(87) PCT Pub. No.: WO2020/164824
PCT Pub. Date: Aug. 20, 2020

(65) Prior Publication Data
US 2022/0095136 A1 Mar. 24, 2022

(30) Foreign Application Priority Data
Feb. 14, 2019 (EP) ..................... 19157325

(51) Int. Cl.
*H04W 24/08* (2009.01)
*H04W 24/10* (2009.01)
*H04W 74/0833* (2024.01)

(52) U.S. Cl.
CPC ........... *H04W 24/08* (2013.01); *H04W 24/10* (2013.01); *H04W 74/0833* (2013.01)

(58) Field of Classification Search
CPC . H04W 24/08; H04W 24/10; H04W 74/0833; H04W 72/542; H04L 1/08;
(Continued)

(56) References Cited

U.S. PATENT DOCUMENTS

2010/0309877 A1* 12/2010 Damnjanovic ..... H04W 74/002
370/329
2012/0182944 A1* 7/2012 Sorrentino ............ H04L 5/0044
370/329

(Continued)

FOREIGN PATENT DOCUMENTS

WO 2020/028865 A1 2/2020

OTHER PUBLICATIONS

Holma et al., "LTE for UMTS OFDMA and SC-FDMA Based Radio Access", John Wiley and Sons, 2009, pp. 25-27.
(Continued)

*Primary Examiner* — Hashim S Bhatti
(74) *Attorney, Agent, or Firm* — XSENSUS LLP

(57) ABSTRACT

A communications device for transmitting data to or receiving data from an infrastructure equipment forming part of a wireless communications network. The communications device comprises circuitry configured to transmit signals to the infrastructure equipment via a wireless access interface provided by the wireless communications network, receive signals from the infrastructure equipment via the wireless access interface, determine that the communications device is to send an indication of quality information to the infrastructure equipment, the quality information indicating a relative quality of signals received by the communications device, perform measurements on one or more signals received by the communications device from the infrastructure equipment, encode the indication of quality information, based on the performed measurements, using at least
(Continued)

one bit of a first signal in combination with a parameter of a second signal, and transmit the first signal to the infrastructure equipment.

20 Claims, 6 Drawing Sheets

(58) Field of Classification Search
CPC ... H04L 1/0003; H04L 1/0009; H04L 1/0029; H04L 1/0035; H04L 1/0039; H04L 1/0027; H04L 1/0026
See application file for complete search history.

(56) References Cited

U.S. PATENT DOCUMENTS

| 2013/0155981 | A1* | 6/2013 | Kitazoe | H04W 8/26 370/329 |
|---|---|---|---|---|
| 2021/0219166 | A1* | 7/2021 | Morozov | H04L 1/203 |

OTHER PUBLICATIONS

Sony, "On Providing Quality Report in Message 3", 3GPP TSG RAN WG1 Meeting #94, R1-1808351, Aug. 20-24, 2018, 4 pages.
Ericsson, "Revised WID for Further Enhanced MTC for LTE", 3GPP TSG RAN Meeting #73, RP-161464, Sep. 19-22, 2016, 6 pages.
Huawei et al., "Revised Work Item Proposal: Enhancements of NB-IoT", 3GPP TSG RAN Meeting #73, RP-161901, Sep. 19-22, 2016, 8 pages.
Ericsson et al., "New WID on Even further enhanced MTC for LTE", 3GPP TSG RAN Meeting #75, RP-170732, Mar. 6-9, 2017, 4 pages.
Huawei et al., "New WID on Further NB-IoT Enhancements", 3GPP TSG RAN Meeting #75, RP-170852, Mar. 6-9, 2017, 6 pages.
NTT Docomo, Inc., "Revised WID on New Radio Access Technology", 3GPP TSG RAN Meeting #78, RP-172834, Dec. 18-21, 2017, 11 pages.
Ericsson et al., "New WID on Rel-16 Enhancements for NB-IoT", 3GPP TSG RAN Meeting #80, RP-181451, Jun. 11-14, 2018, 4 pages.
Ericsson, "Revised WID: Additional MTC Enhancements for LTE", 3GPP TSG RAN Meeting #81, RP-181878, Sep. 10-13, 2018, 4 pages.
3GPP, "Evolved Universal Terrestrial Radio Access (E-UTRA); Physical Layer Procedures (Release 12)", 3GPP TS 36.213 V12.8.0, Dec. 2015, pp. 1-241.
3GPP, "Evolved Universal Terrestrial Radio Access (E-UTRA); Physical layer Procedures (3GPP TS 36.213 version 13.0.0 Release 13)", ETSI TS 136 213 V13.0.0, May 2016, pp. 1-327.
Samsung, "Feature Summary of 6.2.1.5 Support of quality report in Msg3", 3GPP TSG RAN WG1 Meeting #95, R1-1813741, Nov. 12-16, 2018, 12 pages.
Ericsson, "Support of Quality Report in Msg3 in LTE-MTC", 3GPP TSG-RAN WG1 Meeting #95, Tdoc R1-1812123, Nov. 12-15, 2018, 7 pages.
Intel Corporation, "DL Quality Reporting in Msg3 for eMTC", 3GPP TSG RAN WG1 Meeting #95, R1-1812456, Oct. 12-16, 2018, 6 pages.
Zte, "Support of Quality Report in Msg3 for Non-Anchor Access", 3GPP TSG RAN WG1 Meeting #95, R1-1812777, Nov. 12-16, 2018, 5 pages.
International Search Report and Written Opinion mailed on Jan. 10, 2020, received for PCT Application PCT/EP2020/050577, Filed on Apr. 23, 2020, 13 pages.

* cited by examiner

COMMUNICATIONS DEVICE, INFRASTRUCTURE EQUIPMENT AND METHODS FOR QUALITY INFORMATION REPORT

CROSS-REFERENCE TO RELATED APPLICATIONS

The present application is based on PCT filing PCT/EP2020/050577, filed Jan. 10, 2020, which claims the priority of European patent application no. EP 19157325.2, filed Feb. 14, 2019, the contents of each are hereby incorporated by reference.

BACKGROUND

Field of Disclosure

The present disclosure relates to communications devices which are configured to transmit data to and receive data from infrastructure equipment in a wireless communications network, where the communications devices are configured to transmit indications of quality information to the infrastructure equipment.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things" or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. The IoT is further enhanced in 3GPP by the introduction of two additional Release 16 Work Items, namely A-MTC (Additional Machine Type Communications Enhancements) [5] and A-NB-IoT (Additional Enhancement for Narrowband Internet of Things) [6].

At least some devices making use of these technologies are expected to be low complexity and inexpensive devices requiring relatively infrequent communication of relatively low bandwidth data.

The increasing use of different types of network infrastructure equipment and terminal devices associated with different traffic profiles give rise to new challenges for efficiently handling communications in wireless communications systems that need to be addressed.

SUMMARY OF THE DISCLOSURE

The present disclosure can help address or mitigate at least some of the issues discussed above.

As such, embodiments of the present technique can provide a communications device for transmitting data to or receiving data from an infrastructure equipment forming part of a wireless communications network. The communications device comprises transmitter circuitry configured to transmit signals to the infrastructure equipment via a wireless access interface provided by the wireless communications network, receiver circuitry configured to receive signals from the infrastructure equipment via the wireless access interface, and controller circuitry configured in combination with the receiver circuitry and the transmitter circuitry to determine that the communications device is to send an indication of quality information to the infrastructure equipment, the quality information indicating a relative quality of signals received by the communications device, to perform measurements on one or more signals received by the communications device from the infrastructure equipment, to encode the indication of quality information, based on the performed measurements, using at least one bit of a first signal in combination with a parameter of a second signal, and to transmit the first signal to the infrastructure equipment.

Respective aspects and features of the present disclosure are defined in the appended claims. It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
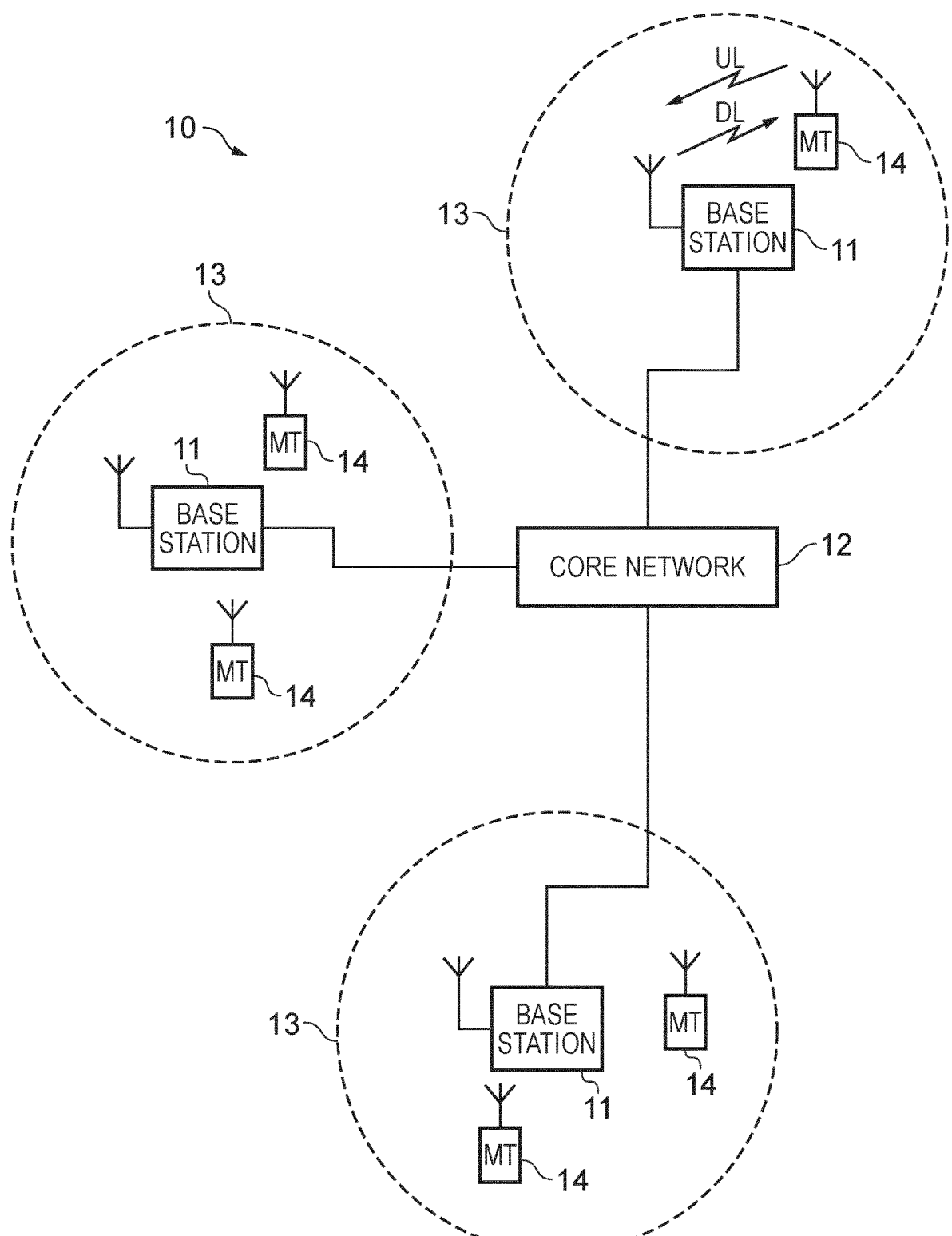
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [7]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB)

Massive Machine Type Communications (mMTC)

Ultra Reliable & Low Latency Communications (URLLC) [8]

eMBB services are characterised by high capacity with a requirement to support up to 20 Gb/s. The requirement for URLLC is a reliability of $1\text{-}10^{-5}$ (99.999%) for one transmission of a relatively short packet such as 32 bytes with a user plane latency of 1 ms.

The elements of the wireless access network shown in FIG. 1 may be equally applied to a 5G new RAT configuration, except that a change in terminology may be applied as mentioned above.

Figure 2:
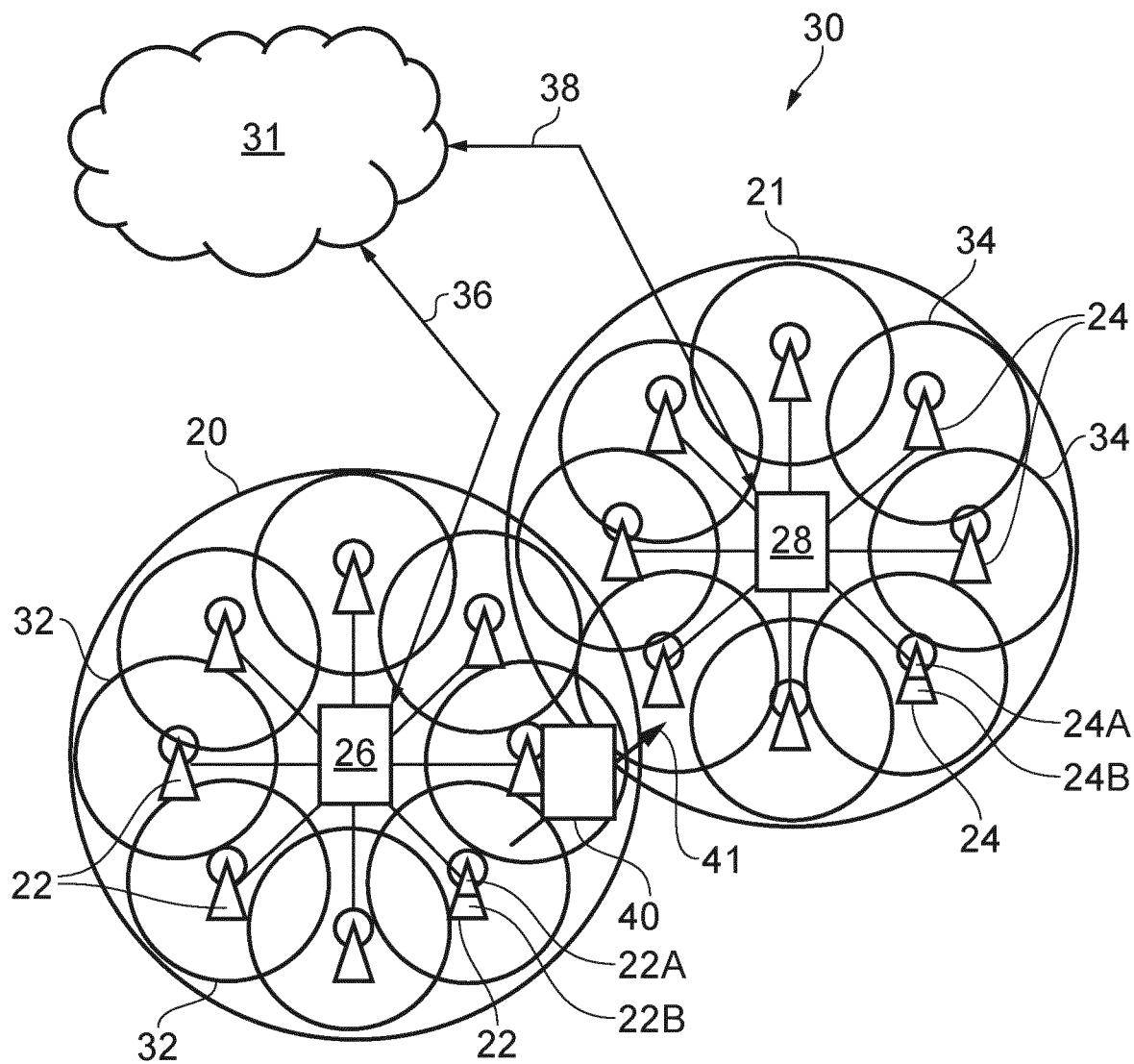
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, gNodeB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Current RACH Procedures in LTE

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

In addition to a terminal device deciding itself to initiate a random access procedure to connect to the network, it is also possible for the network, e.g. a base station, to instruct a terminal device in connected mode to initiate a random access procedure by transmitting to the terminal device an instruction to do so. Such an instruction is sometimes referred to as a PDCCH order (Physical Downlink Control Channel order), see, for example, Section 5.3.3.1.3 in ETSI TS 136 213 V13.0.0 (2016 January)/3GPP TS 36.212 version 13.0.0 Release 13 [9].

There are various scenarios in which a network triggered RACH procedure (PDCCH order) may arise. For example:
- a terminal device may receive a PDCCH order to transmit on PRACH as part of a handover procedure;
- a terminal device that is RRC connected to a base station but has not exchanged data with the base station for a relatively long time may receive a PDCCH order to cause the terminal device to transmit a PRACH preamble so that it can be re-synchronised to the network and allow the base station to correct timings for the terminal device;
- a terminal device may receive a PDCCH order so that it can establish a different RRC configuration in the subsequent RACH procedure, this may apply, for example, for a narrowband IoT terminal device which is prevented from RRC reconfiguration in connected mode whereby sending the terminal device to idle mode through a PDCCH order allows the terminal device to be configured in the subsequent PRACH procedure, for example to configure the terminal device for a different coverage enhancement level (e.g. more or fewer repetitions).

For convenience, the term PDCCH order is used herein to refer to signalling transmitted by a base station to instruct a terminal device to initiate a PRACH procedure regardless of the cause. However, it will be appreciated such an instruction may in some cases be transmitted on other channels/in higher layers. For example, in respect of an intra-system handover procedure, what is referred to here as a PDCCH order may be an RRC Connection Reconfiguration instruction transmitted on a downlink shared channel/PDSCH.

When a PDCCH order is transmitted to a terminal device, the terminal device is assigned a PRACH preamble signature sequence to use for the subsequent PRACH procedure. This is different from a terminal device triggered PRACH procedure in which the terminal device selects a preamble from a predefined set and so could by coincidence select the same preamble as another terminal device performing a PRACH procedure at the same time, giving rise to potential contention. Consequently, for PRACH procedures initiated by a PDCCH order there is no contention with other terminal devices undertaking PRACH procedures at the same time because the PRACH preamble for the PDCCH ordered terminal device is scheduled by the network/base station.

Figure 3:
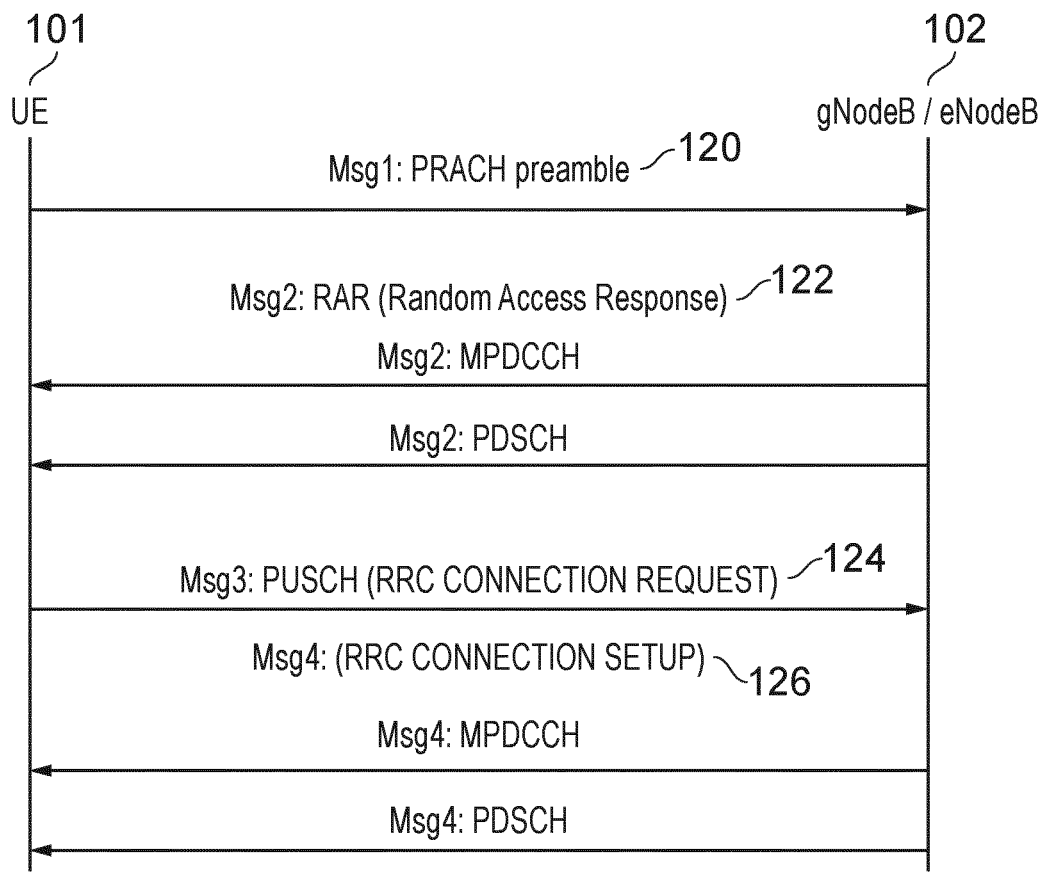
FIG. 3 is a schematic representation illustrating steps in a four-step random access procedure in a wireless telecommunications network.

FIG. 3 shows a typical RACH procedure used in LTE systems such as that described by reference to FIG. 1 which could also be applied to an NR wireless communications system such as that described by reference to FIG. 2. A UE 101, which could be in an inactive or idle mode, may have some data which it needs to send to the network. To do so, it sends a random access preamble 120 to a gNodeB (or indeed eNodeB, etc.) 102. This random access preamble 120, also termed "Msg1" in the context of RACH procedures, indicates to the gNodeB 102 that the UE wishes to transmit in the uplink, such that the gNodeB 102 can allocate uplink resource to the UE 101 during later stages of the RACH procedure. Before sending this random access preamble 120, the UE 101 will measure channel quality, for example via making a reference signal received power (RSRP) measurement on the central physical resource blocks (PRBs) of the downlink carrier. Based on this, the UE 101 determines a PRACH coverage enhancement (CE) level, and determines PRACH resources to be used for transmitting the PRACH preamble 120. Finally, this preamble 120 is transmitted by the UE 101 using the determined PRACH resources and at the repetition level associated with the determined PRACH CE level.

Assuming the random access preamble 120 is successfully received by the gNodeB 102 (and if not, the UE 101 will simply re-transmit it with a higher power or at a higher repetition level/at a higher coverage enhancement level), the gNodeB 102 will transmit a random access response 122 message to the UE 101 with an identity based on the physical resources used in the received random access preamble 120. The random access response 122 message, also termed "Msg2" in the context of RACH procedures, and also carries a timing advance value (such that the UE 101 can change its timing to compensate for the round trip delay caused by its distance from the gNodeB 102) and grant uplink resources for the UE 101 to transmit the data in. The random access response message 122 also allocates uplink resources for a Msg3 transmission by the UE 101. Firstly, in Msg2, the gNodeB 102 transmits an MTC PDCCH (MPDCCH) that allocates a Msg2 PDSCH; it is this PDSCH which actually carries the RAR 122. The MPDCCH repetition level can be based on a mapping between the PRACH CE level and the MPDCCH repetition level.

Following the reception of the random access response message 122, the UE 101 transmits the scheduled transmission of data 124 to the gNodeB 102, using the identity and resources assigned to it in the random access response message 122. Assuming there are no collisions with other UEs, which may occur if another UE and the UE 101 send the same random access preamble 120 to the gNodeB 102 at the same time and using the same frequency resources, the scheduled transmission of data 124, also termed "Msg3" in the context of RACH procedures, is successfully received by the gNodeB 102. Msg3 may carry either of the RRC messages RRC CONNECTION REQUEST or RRC CONNECTION RESUME REQUEST; it should be noted that although FIG. 3 shows this message to be an RRC CONNECTION REQUEST, the signalling diagram of FIG. 3 would be equally applicable for cases where Msg3 carries an RRC CONNECTION RESUME REQUEST message.

The gNodeB 102 will respond to the scheduled transmission 124 with a Msg4 126, which may be some form of contention resolution message. This Msg4 126 is transmitted in a PDSCH allocated by an MPDCCH, and may carry either of the RRC messages RRC CONNECTION SETUP or RRC CONNECTION RESUME. Msg4 may also contain downlink data for the UE.

Figure 4:
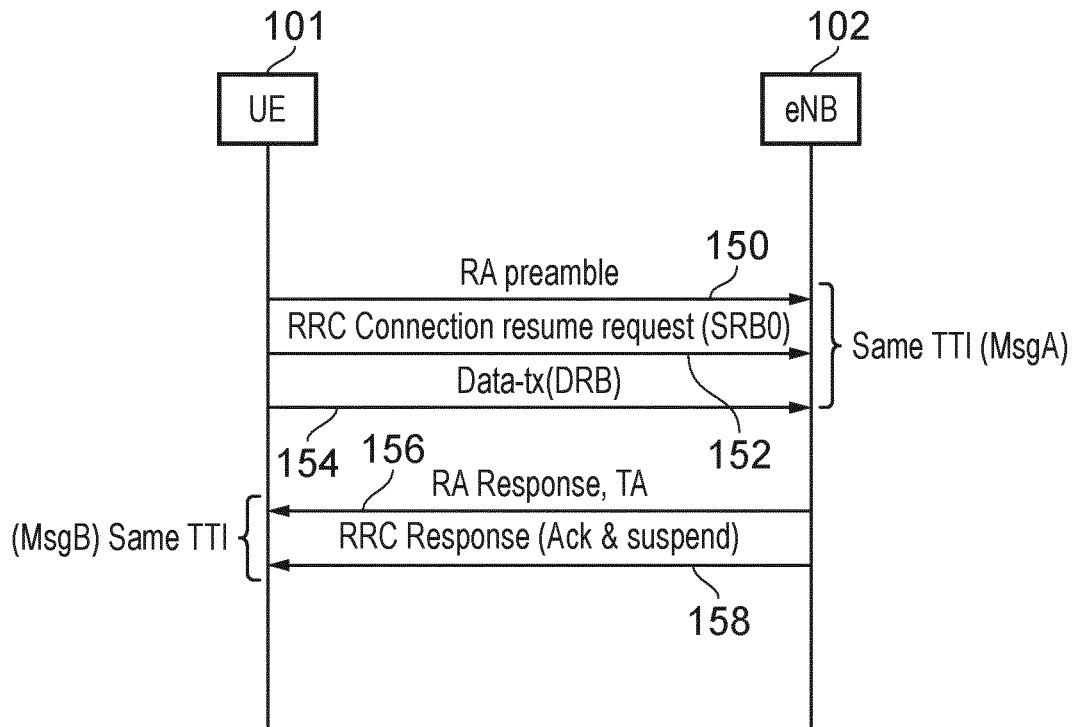
FIG. 4 is a schematic representation illustrating an example two-step RACH procedure which could be applied for transmissions of small amounts of data.
Figure 5:
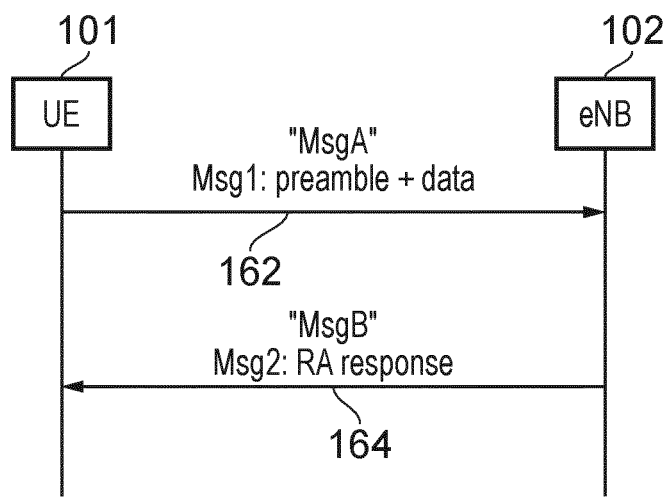
FIG. 5 is a schematic representation illustrating steps in a two-step random access procedure in a wireless telecommunications network.

FIGS. 4 and 5 each show examples of a simplified two-step RACH procedure, in which small amounts of data can be transmitted by a UE 101 to an gNodeB or eNodeB 102. In the two-step RACH procedure, the data is transmitted at the same time as the RACH preamble (message 162 in FIG. 5), and so there is no need for the UE 101 to wait for a response from the network providing it with an uplink grant to transmit its data. However, the downside is that a limited amount of data can be transmitted in message 1. Following the reception of message 1 at the eNodeB 102, the eNodeB 101 transmits a random access response (message 162 in FIG. 5) to the UE 101, which comprises an acknowledgement of the received data in message 1. FIG. 4 shows the messages in a little more detail, where in message 1 (also termed herein msgA), the random access preamble 150, RRC connection resume request 152, and the small amount of data 154 are transmitted during the same transmission time interval (TTI). This message msgA is essentially a combination of Message 1 and Message 3 in the 4-step RACH procedure as shown for example in FIG. 3. Likewise, for message 2 (also termed herein msgB), the random access response with timing advance 156 and the RRC response 158 (comprising an acknowledgement and RRC suspend command) are transmitted by the eNodeB 102 to the UE 101 during the same TTI. This message msgB is essentially a combination of Message 2 and Message 4 in the 4-step RACH procedure as shown for example in FIG. 3.

Recent study and development of eMTC includes the objective of sending a measurement report in message 3 of a PRACH process, such as the msg3 124 shown in the four-step RACH process of FIG. 3, or the msg3 (i.e. data) portion of msgA 162 shown in the two-step RACH process of FIG. 5. This measurement report can be used to optimise the transmission of message 4 of the PRACH process (whether it be in a four-step RACH process or msgB of a two-step RACH process) and further downlink messages. The optimisation can consist of choosing an appropriate number of repetitions and/or modulation and coding scheme.

In previous approaches, there are a number of aspects of how the measurement can be undertaken and when it can be transmitted:
  The measurement report can either be configured by semi-static signaling or can be transmitted if the channel conditions are worse than a threshold;
  The measurement report can be requested from the eNodeB using a bit in Msg2 (Msg2 is transmitted by the eNodeB);
  The measurement report can be sent to the eNodeB either via an EDT (early data transmission) message or by indicating through the use of a PRACH preamble in a PRACH partitioning scheme that the UE is going to transmit a quality report;
  The measurement of channel quality is performed either before the preamble is transmitted in Msg1 or in response to reception of a Msg2 (indicating that a quality report is to be transmitted by the UE);
  The measurement report is either an RSRP measurement or a CQI measurement (channel quality indication).

In NB-IoT, a UE can transmit a quality report in Msg3 of the PRACH process. Msg3 is either a "long CQI" report or a "short CQI" report, where either of these CQI reports wholly contain a value of the measurement (the difference between the long CQI report and the short CQI report is the number of bits for the transmission of these reports, i.e. the granularity of these reports).

As described above with reference to FIG. 3, as part of the PRACH procedure, the UE firstly makes a measurement of channel conditions and determines a PRACH coverage level. The PRACH coverage level determines the number of repetitions that need to be applied to the PRACH (for UEs in very bad coverage conditions, a larger number of PRACH repetitions needs to be sent in order to provide sufficient receive energy at the eNodeB). There are four PRACH coverage levels: levels CE0, CE1, CE2 and CE3, which generally have respective associated PRACH repetition levels of none, low, medium and high. The UE chooses PRACH resources for transmission of a PRACH preamble based on the coverage level (choice of the PRACH resources can include choice of a preamble sequence, a time resource for the PRACH, and a frequency resource for the PRACH). The base station can then determine the coverage level of the UE based on the PRACH signature sequence used by the UE.

It is expected that the measurement report will be transmitted as part of the RRC message that is transmitted in Msg3 (e.g. RRC CONNECTION REQUEST or RRC CONNECTION RESUME REQUEST). For MTC, these RRC messages (e.g. RRC CONNECTION REQUEST or RRC CONNECTION RESUME REQUEST) are currently close to the maximum possible message size for Msg3: there are up to only two spare bits available for new fields in these RRC messages, i.e. the existing RRC message in Msg3 has only very few spare bits to signal information for new features (where transmission of a quality report in Msg3 is a new feature). One possibility to solve this issue would be to change the size of the RRC messages themselves for new MTC devices (e.g. MTC release 16 devices), but this would cause issues with legacy devices and result in the requirement for a gNodeB to attempt to decode two different messages during the PRACH procedure, without knowing whether the RRC message is coming from a new or legacy UE.

Measuring channel quality has an accuracy that is in the range of 3-6 dB. The inaccuracy here is due to the changing channel conditions (fast fading) and the inherent statistical inaccuracy that is associated with measuring over a limited time duration and over a limited bandwidth. The signal to noise ratio (SNR) range that needs to be signalled in the quality report is approximately −20 dB to 10 dB; i.e. a 30 dB range. This range covers the maximum level of required coverage enhancement (about −20 dB SNR) at the worst channel conditions through to channel conditions that would be suitable for 16QAM transmissions (about 10 dB SNR). Hence, the number of levels of quality measurements that need to be transmitted is in the range of:
  10 levels for a 3 dB measurement accuracy (30 dB/3 dB=10 levels); and
  5 levels for a 6 dB measurement accuracy (30 dB/6 dB=5 levels).

A 3 bit measurement report would equate to 3.75 dB steps in measurement accuracy and this number of bits would appear to be an appropriate number for expressing the measurement accuracy. In 3GPP, the quality report for MTC is agreed to be in the form of a hypothetical MPDCCH repetition, and for the case where the MPDCCH repetition=1, there may also be a hypothetical aggregation level to achieve a target block error rate (BLER) (e.g. 1%)—i.e. it is required to determine what the "hypothetical" (i.e. required) aggregation level or number of repetitions is to receive this 1% (or other value) BLER. Whether the measurement is in SNR (e.g. dB) or hypothetical MPDCCH repetition, the aim is to provide the eNB with some indication of the quality of the UE radio condition so that it can schedule an appropriate MCS for Msg4.

As stated above, only 1 or 2 spare bits are available for transmission in the RRC message, which is insufficient for transmitting a 3 bit measurement quality report. Embodiments of the present technique seek to provide solutions on how to transmit a quality report for Msg3 (e.g. 3 bits) using a limited number of bits (e.g. 1 bit) in a higher layer message.

Transmission of Msg3 Quality Report Using a Restricted Number of Bits

Figure 6:
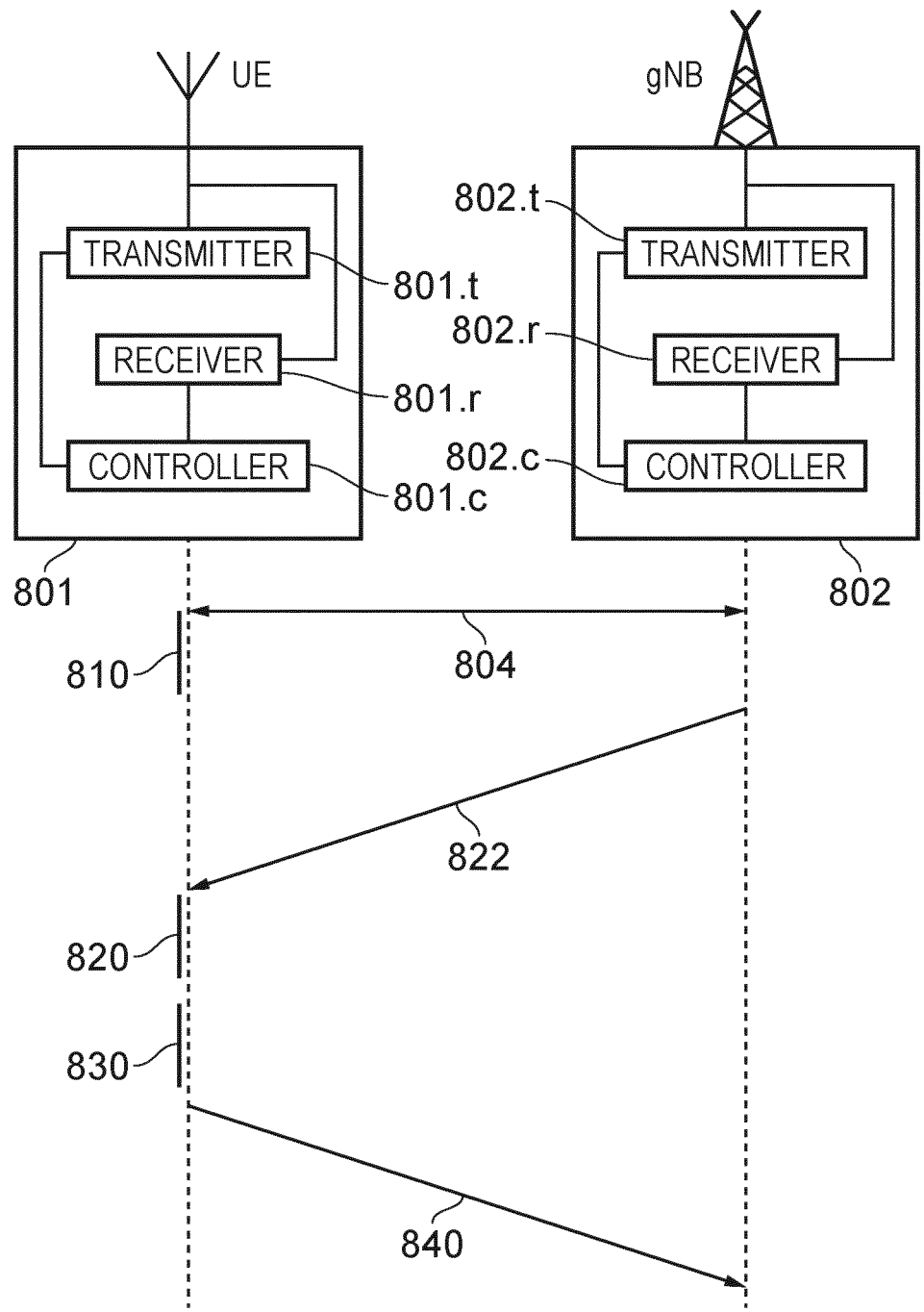
FIG. 6 is a part schematic representation, part message flow diagram of communications between a communications device and an infrastructure equipment of a wireless communications network in accordance with embodiments of the present technique.

FIG. 6 provides a part schematic representation, part message flow diagram of communications between a communications device or UE 801 and an infrastructure equipment or eNodeB 802 of a wireless communications network in accordance with embodiments of the present technique. The communications device 801 comprises a transmitter (or transmitter circuitry) 801.*t* configured to transmit signals to the infrastructure equipment 802 via a wireless access interface 804 provided by the wireless communications network, a receiver (or receiver circuitry) 801.*r* configured to receive signals from the infrastructure equipment 802 via the wireless access interface 804, and a controller (or controller circuitry) 801.*c* configured to control the transmitter circuitry 801.*t* and the receiver circuitry 801.*r* to transmit or to receive the signals. As can be seen in FIG. 6, the infrastructure equipment 802 also comprises a transmitter (or transmitter circuitry) 802.*t* configured to transmit signals to the communications device 801 (which may be one of a plurality of communications devices) via the wireless access interface 804, a receiver (or receiver circuitry) 802.*r* configured to receive signals from the communications device 801 via the wireless access interface 804, and a controller (or controller circuitry) 802.*c* configured to control the transmitter circuitry 802.*t* and the receiver circuitry 802.*r* to transmit or to receive the signals representing data. Each of the controllers 801.*c*, 802.*c* may be, for example, a microprocessor, a CPU, or a dedicated chipset, etc.

The controller circuitry 801.*c* of the communications device 801 is configured in combination with the receiver circuitry 801.*r* and the transmitter circuitry 801.*t* of the communications device 801 to determine 810 that the communications device 801 is to send an indication of quality information to the infrastructure equipment 802, the quality information indicating a relative quality of signals received by the communications device 801, to perform measurements 820 on one or more signals 822 received by the communications device 801 from the infrastructure equipment 802, to encode 830 the indication of quality information, based on the performed measurements 820, using at least one bit of a first signal in combination with a parameter of a second signal (this second signal may be either an uplink signal transmitted to the infrastructure equipment by the communications device or may be a downlink signal received by the communications device from the infrastructure equipment), and to transmit 840 the first signal to the infrastructure equipment 802.

Correspondingly, the controller circuitry 802.*c* of the infrastructure equipment 802 is configured in combination with the receiver circuitry 802.*r* and the transmitter circuitry 802.*t* of the infrastructure equipment 802 to receive a first signal 840 from the communications device 801, and to determine, based on at least one bit of the first signal in combination with a parameter of a second signal (again, as above, this second signal may be either an uplink signal transmitted to the infrastructure equipment by the communications device or may be a downlink signal received by the communications device from the infrastructure equipment), an indication of quality information, the quality information indicating a relative quality of signals received by the communications device 801.

Essentially, embodiments of the present technique propose that a quality report may be encoded based on a parameter of a first channel (also termed herein "second signal") and a small number of bits in a higher layer message (also termed herein "first signal"). The higher layer message/first signal may be transmitted in message 3 of the PRACH process. Here, a "small" number of bits generally refers to one or two bits, but possibly could be more, depending on for example the number of free bits in a given higher layer message/first signal. The small number of bits allows the indication of a finer granularity of channel quality than can be provided by the parameter of the second signal alone, for example where this may refer to a PRACH CE level (the second signal here being the PRACH and the CE level of the PRACH being the parameter of the second signal).

In some arrangements of embodiments of the present technique, the communications device may be configured to determine that the communications device is to send the indication of quality information to the infrastructure equipment by receiving an instruction from the infrastructure equipment to send the indication of quality information. In other arrangements of embodiments of the present technique, the communications device is configured to perform a random access procedure to connect to the wireless communications network, and wherein the communications device is configured to determine that the communications device is to send the indication of quality information to the infrastructure equipment as part of the random access procedure.

In some arrangements of embodiments of the present technique, a single bit (or indeed, in some arrangements, two or more bits) may be transmitted in the RRC message of the first signal and this is used in conjunction with the PRACH CE level to encode the overall quality measurement report. In other words, the second signal is a Physical Random Access Channel, PRACH, transmitted by the communications device to the infrastructure equipment as part of the random access procedure. Here, the parameter of the second signal is a coverage enhancement, CE, level of the PRACH. For example, the single bit can indicate the status of either:

Good channel quality within the CE level, e.g. single bit='1'; or

Poor channel quality within the CE level, e.g. single bit='0'

This allows the base station to tailor the transport format used for message 4 based on this single bit and the CE level. In other words, the communications device is configured to receive a third signal from the infrastructure equipment, the third signal being transmitted by the infrastructure equipment in accordance with a transport format defining values of one or more communications parameters with which the third signal should be transmitted and having been selected from among a plurality of transport formats dependent on the indication of quality information. It should be appreciated by those skilled in the art that, here and in the appended claims, "third signal" may not necessarily refer to or be associated with message 4. The third signal is broadly any downlink message from the eNodeB after it has received the quality report from the UE, which may be message 4 of a RACH procedure, or may some other signal, such as the MPDCCH scheduling message 4, or downlink messages once the UE has completed the RACH procedure and is connected to the eNodeB.

Here, the one or more communications parameters having values which are defined by the plurality of transport formats and with which the third signal should be transmitted comprise at least one of a modulation scheme to be applied to the third signal, a coding rate to be applied to the third signal, and a number of repetitions of the third signal. For example, the transport format for message 4 can be based on the following mapping, shown in Table I below, between the PRACH CE level and the single bit report:

TABLE I

How transport format for Msg4 may depend on quality information indicated by single bit in Msg3 and PRACH CE level

| CE level | Single bit report in Msg3 | Transport format for Msg4 |
| --- | --- | --- |
| 0 | 0 | QPSK R=1/3 REP0 |
|   | 1 | 16QAM R=0.5 REP1 |
| 1 | 0 | QPSK R=1/3 REP4 |
|   | 1 | QPSK R=1/3 REP2 |

TABLE I-continued

How transport format for Msg4 may depend on quality information indicated by single bit in Msg3 and PRACH CE level

| CE level | Single bit report in Msg3 | Transport format for Msg4 |
| --- | --- | --- |
| 2 | 0 | QPSK R=1/3 REP32 |
|  | 1 | QPSK R=1/3 REP16 |
| 3 | 0 | QPSK R=1/3 REP1024 |
|  | 1 | QPSK R=1/3 REP256 |

Essentially, the columns in Table I show how one of a number of (increasing) quality levels (eight quality levels in the above example shown by Table I) may be indicated by the UE, as interpreted by the network based on the CE level and single bit report. Then, the base station determines an appropriate transport format for Msg4 (in terms of modulation scheme and coding rate (i.e. MCS) and the repetition level) when taking the indicated quality level into account.

Another way to describe such arrangements is that the combination of CE level and the single bit report in Msg3 maps to a hypothetical MPDCCH repetition and/or Aggregation Level that gives a 1% BLER for MPDCCH. Indeed, "quality reports" or "quality information" as termed herein may be defined in such a manner. An example is shown in Table II below:

TABLE II

How quality information indicated by single bit in Msg3 and PRACH CE level may indicate a hypothetical MPDCCH repetition and/or aggregation level to achieve 1% BLER

| CE level | Single bit report in Msg3 | Hypothetical MPDCCH Repetition |
| --- | --- | --- |
| 0 | 0 | Rep1, AL=8 |
|  | 1 | Rep1, AL=16 |
| 1 | 0 | Rep4, AL=16 |
|  | 1 | Rep8, AL=16 |
| 2 | 0 | Rep16, AL=16 |
|  | 1 | Rep32, AL=16 |
| 3 | 0 | Rep64, AL=16 |
|  | 1 | Rep128, AL=16 |

It should of course be appreciated that this is one example of repetition mapping with the joint information of CE level and the Msg3 report. These repetition mappings, and indeed repetition/transport format mappings as shown in each of Tables I to VI, can be specified in the specifications, signalled by RRC (e.g. SIBs) or dynamically indicated, e.g. in DCI or in the RAR. In other words, the communications device may be configured to receive, from the infrastructure equipment, an indication of a mapping between the at least one bit of the first signal, the parameter of the second signal, and the transport format of the third signal via RRC signalling. Alternatively, or in addition, the communications device may be configured to perform a random access procedure to connect to the wireless communications network, and wherein the communications device is configured to receive a dynamic indication of a mapping between the at least one bit of the first signal, the parameter of the second signal, and the transport format of the third signal in a random access response message received by the communications device from the infrastructure equipment as part of the random access procedure.

Alternatively, or in addition, the communications device is configured to receive, from the infrastructure equipment, a dynamic indication of a mapping between the at least one bit of the first signal, the parameter of the second signal, and the transport format of the third signal as Downlink Control Information, DCI. Alternatively, or in addition, a mapping between the at least one bit of the first signal, the parameter of the second signal, and the transport format of the third signal may be fixed and predefined, and known by the communications device.

Alternatively, the UE may be implemented based on a known mapping between the at least one bit of the first signal, the parameter of the second signal and a characteristic of a third signal. For example, the communications device is designed and implemented such that the relationship of Table II holds true. In other words, the UE is tested such that when it signals "single bit"=0 having transmitted PRACH at CE level 1, it can then receive an MPDCCH with AL=16 and 4 repetitions at a BLER of less than 1%. However the network access node is able to transmit the MPDCCH at any desired AL and repetition level and the UE has to determine that AL and repetition level according to known techniques.

In some arrangements of embodiments of the present technique, a single bit (or indeed, in some arrangements, two or more bits) may be transmitted in the RRC message and this is used in conjunction with the repetition level applied to one of the channels used to transmit Msg2 to encode the overall quality measurement report. In other words, the second signal is a control channel (e.g. MPDCCH) received by the communications device from the infrastructure equipment as part of the random access procedure, the control channel comprising an indication of a communications resource allocation for a random access response message. Here, the parameter of the second signal may be a number of repetitions of the control channel transmitted by the infrastructure equipment. Alternatively, the parameter of the second signal may be a modulation and coding scheme, MCS, in accordance with which the control channel is transmitted by the infrastructure equipment. The UE decodes the MPDCCH and from the DCI (transmitted in the MPDCCH) determines the repetition level that was applied to the MPDCCH. The single bit can then indicate a quality report in Msg3 of either:

Repetition level of MPDCCH divided by 2, e.g. single bit='1'; or

Repetition level of MPDCCH, e.g. single bit='0'

For example, the following mapping, shown in Table III below, between the single bit and the repetition level of the MPDCCH allocating the PDSCH for Msg2 can be applied:

TABLE III

How transport format for Msg4 may depend on quality information indicated by single bit in Msg3 and MPDCCH repetition level

| MPDCCH repetitions | Single bit report in Msg3 | Transport format for Msg4 |
| --- | --- | --- |
| 1 | 0 | QPSK R=1/3 REP1 |
|  | 1 | 16QAM R=0.5 REP1 |
| 4 | 0 | QPSK R=1/3 REP4 |
|  | 1 | QPSK R=1/3 REP2 |
| 16 | 0 | QPSK R=1/3 REP16 |
|  | 1 | QPSK R=1/3 REP8 |
| 64 | 0 | QPSK R=1/3 REP64 |
|  | 1 | QPSK R=1/3 REP32 |
| Etc. |  |  |

In an alternative arrangement of embodiments of the present technique, the single bit can be used to specifically indicate the modulation and coding scheme (MCS) that can be applied to Msg4 using the repetition level of the MPDCCH. For example, the single bit can indicate a quality report in Msg3 of either:

16QAM R=0.5, e.g. single bit='1'; or
QPSK R=1.3, e.g. single bit='0'.

For example, the following mapping, as shown in Table IV below, between the single bit and the repetition level of the MPDCCH allocating the PDSCH for Msg2 can be applied:

TABLE IV

How transport format for Msg4 may depend on quality information indicated by single bit in Msg3 and MPDCCH repetition level (where the single bit specifically indicates an MCS)

| MPDCCH repetitions | Single bit report in Msg3 | Transport format for Msg4 |
|---|---|---|
| 1 | 0 | QPSK R=1/3 REP1 |
|  | 1 | 16QAM R=0.5 REP1 |
| 4 | 0 | QPSK R=1/3 REP4 |
|  | 1 | 16QAM R=0.5 REP4 |
| 16 | 0 | QPSK R=1/3 REP16 |
|  | 1 | 16QAM R=0.5 REP16 |
| 64 | 0 | QPSK R=1/3 REP64 |
|  | 1 | 16QAM R=0.5 REP64 |
| Etc. |  |  |

While this above arrangement has been described in terms of the repetition level applied to the (M)PDCCH allocating the PDSCH carrying Msg2, it can also be equally applied to the repetition level of the PDSCH carrying Msg2 (i.e. the RAR) itself. In other words, the second signal is a random access response message received by the communications device from the infrastructure equipment as part of the random access procedure. Here, the parameter of the second signal is a number of repetitions of the random access response message transmitted by the infrastructure equipment. Alternatively, the parameter of the second signal is an MCS in accordance with which the random access response message is transmitted by the infrastructure equipment.

For example, the following mapping between the single bit and the repetition level of the PDSCH carrying Msg2 can be applied:

TABLE V

How transport format for Msg4 may depend on quality information indicated by single bit in Msg3 and RAR-carrying PDSCH repetition level

| REP level of PDSH carrying Msg2 | Single bit report in Msg3 | Transport format for Msg4 |
|---|---|---|
| 1 | 0 | QPSK R=1/3 REP1 |
|  | 1 | 16QAM R=0.5 REP1 |
| 4 | 0 | QPSK R=1/3 REP4 |
|  | 1 | QPSK R=1/3 REP2 |
| 16 | 0 | QPSK R=1/3 REP16 |
|  | 1 | QPSK R=1/3 REP8 |
| 64 | 0 | QPSK R=1/3 REP64 |
|  | 1 | QPSK R=1/3 REP32 |
| Etc. |  |  |

Again, as described above with reference to the arrangements describing the use of the PRACH CE level and described by way of Tables I and II, the combination of the MPDCCH for Msg2 repetition or the PDSCH for Msg2 repetition with the single bit report in Msg3 can map to a hypothetical MPDCCH repetition (and Aggregation Level) with 1% BLER. An example, using the MPDCCH repetition for Msg2, is shown in Table VI below:

TABLE VI

How quality information indicated by single bit in Msg3 and either MPDCCH or RAR-carrying PDSCH repetition level may indicate a hypothetical MPDCCH repetition and/or aggregation level to achieve 1% BLER

| MPDCCH for Msg2 repetitions | Single bit report in Msg3 | Hypothetical MPDCCH Repetition |
|---|---|---|
| 1 | 0 | 1 |
|  | 1 | 2 |
| 4 | 0 | 4 |
|  | 1 | 8 |
| 16 | 0 | 16 |
|  | 1 | 32 |
| 64 | 0 | 64 |
|  | 1 | 128 |
| Etc. |  |  |

It should be appreciated by those skilled in the art that although problems solved by and solutions provided by embodiments of the present technique are described above primarily in relation to PRACH procedures (both 4-step and 2-step procedures), embodiments of the present technique could equally apply to situations and channel quality reporting other than during a RACH/PRACH procedure. For example, solutions provided by embodiments of the present technique as defined by the appended claims could be equally applied to general CQI or other quality indicator messages sent by a UE or base station, which may be periodic, specifically requested, based on some time or channel quality condition etc. being met, or otherwise. For example, a UE may be requested to transmit a quality report (for example an aperiodic CSI (channel state information)) during an ongoing RRC connection. The quality report, similarly to the case described herein during a PRACH procedure, may consist of a reduced number of bits and is relative to the transport format applied to the message carrying the request received by the UE to transmit a quality report.

As described above, it should also be appreciated by those skilled in the art that the number of bits in Msg3 (or in any first signal otherwise when the quality report is not transmitted as part of a random access procedure) may be greater than 1 bit where that Msg3/first signal allows, in order to provide a finer granularity of the measurement report/quality information. Furthermore, those skilled in the art would appreciate that the first signal (also termed herein "higher layer message") may be a Medium Access Control (MAC) control element (MAC CE) or may be an RRC message. As described above, the quality report in Msg3 can be directly used by the eNodeB. For example, the eNodeB may use the transport format for Msg4 as defined in Tables I or III to V.

Alternatively, the eNodeB may consider the quality report in Msg3, but then the eNodeB may itself decide (without reference to any table, etc.) the transport format for Msg4. As described above, though the UE may be implemented based on a known mapping (i.e. it expects to receive an MPDCCH at a certain AL and with a certain repetition level at a BLER of less than 1% based on the bit it signals in combination with the parameter of the second signal, such as a PRACH CE level), the network access node is able to transmit that MPDCCH at any desired AL and repetition level and the UE has to determine that AL and repetition level according to known techniques.

Flow Diagram Representation

Figure 7:
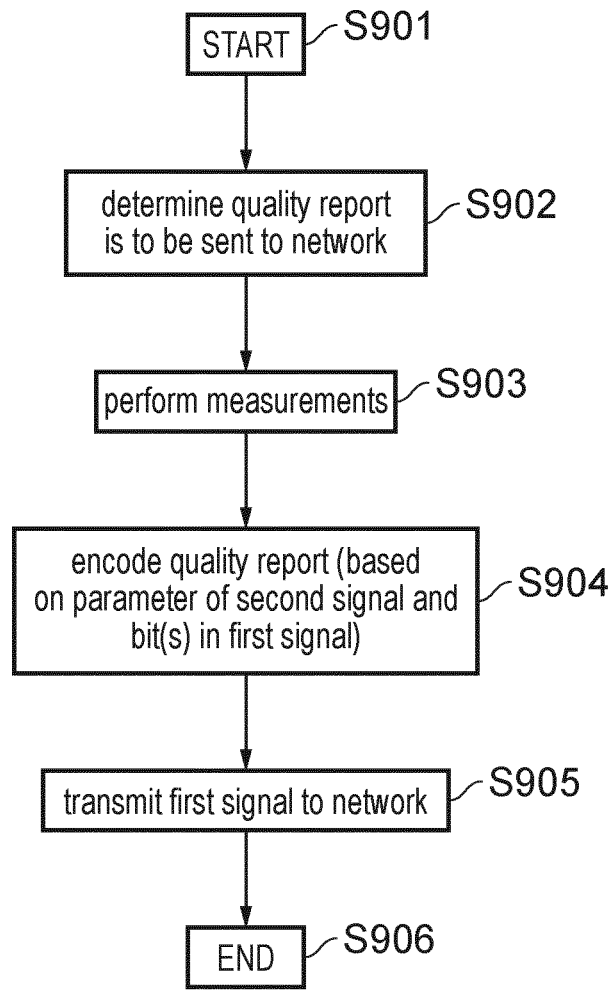
FIG. 7 shows a flow diagram illustrating a process of communications between a communications device and an infrastructure equipment in accordance with embodiments of the present technique.

FIG. 7 shows a flow diagram illustrating method of operating a communications device for transmitting data to an infrastructure equipment of a wireless communications network. The method begins in step S901. The method comprises, in step S902, determining that the communications device is to send an indication of quality information to the infrastructure equipment, the quality information indicating a relative quality of signals received by the communications device. The method then comprises in step S903, performing measurements on one or more signals received by the communications device from the infrastructure equipment via a wireless access interface provided by the wireless communications network. In step S904, the process comprises encoding the indication of quality information, based on the performed measurements, using at least one bit of a first signal in combination with a parameter of a second signal. The process then comprises in step S905, transmitting the first signal to the infrastructure equipment via the wireless access interface. The process ends in step S906.

Those skilled in the art would appreciate that the method shown by FIG. 7 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device for transmitting data to or receiving data from an infrastructure equipment forming part of a wireless communications network, the communications device comprising
- transmitter circuitry configured to transmit signals to the infrastructure equipment via a wireless access interface provided by the wireless communications network,
- receiver circuitry configured to receive signals from the infrastructure equipment via the wireless access interface, and
- controller circuitry configured in combination with the receiver circuitry and the transmitter circuitry
  - to determine that the communications device is to send an indication of quality information to the infrastructure equipment, the quality information indicating a relative quality of signals received by the communications device,
  - to perform measurements on one or more signals received by the communications device from the infrastructure equipment,
  - to encode the indication of quality information, based on the performed measurements, using at least one bit of a first signal in combination with a parameter of a second signal, and
  - to transmit the first signal to the infrastructure equipment.

Paragraph 2. A communications device according to Paragraph 1, wherein the communications device is configured to receive a third signal from the infrastructure equipment, the third signal being transmitted by the infrastructure equipment in accordance with a transport format defining values of one or more communications parameters with which the third signal should be transmitted and having been selected from among a plurality of transport formats dependent on the indication of quality information.

Paragraph 3. A communications device according to Paragraph 2, wherein the one or more communications parameters having values which are defined by the plurality of transport formats and with which the third signal should be transmitted comprise at least one of a modulation scheme to be applied to the third signal, a coding rate to be applied to the third signal, and a number of repetitions of the third signal.

Paragraph 4. A communications device according to any of Paragraphs 1 to 3, wherein the first signal comprises a Medium Access Control, MAC, control element.

Paragraph 5. A communications device according to any of Paragraphs 1 to 4, wherein the communications device is configured to determine that the communications device is to send the indication of quality information to the infrastructure equipment by receiving an instruction from the infrastructure equipment to send the indication of quality information.

Paragraph 6. A communications device according to any of Paragraphs 1 to 5, wherein the communications device is configured to perform a random access procedure to connect to the wireless communications network, and wherein the communications device is configured to determine that the communications device is to send the indication of quality information to the infrastructure equipment as part of the random access procedure.

Paragraph 7. A communications device according to Paragraph 6, wherein the first signal is a Radio Resource Control RRC, signal transmitted by the communications device to the infrastructure equipment as part of the random access procedure.

Paragraph 8. A communications device according to Paragraph 6 or Paragraph 7, wherein the second signal is a Physical Random Access Channel, PRACH, transmitted by the communications device to the infrastructure equipment as part of the random access procedure.

Paragraph 9. A communications device according to Paragraph 8, wherein the parameter of the second signal is a coverage enhancement, CE, level of the PRACH.

Paragraph 10. A communications device according to any of Paragraphs 6 to 9, wherein the second signal is a control channel received by the communications device from the infrastructure equipment as part of the random access procedure, the control channel comprising an indication of a communications resource allocation for a random access response message.

Paragraph 11. A communications device according to Paragraph 10, wherein the parameter of the second signal is a number of repetitions of the control channel transmitted by the infrastructure equipment.

Paragraph 12. A communications device according to Paragraph 10 or Paragraph 11, wherein the parameter of the second signal is a modulation and coding scheme, MCS, in accordance with which the control channel is transmitted by the infrastructure equipment.

Paragraph 13. A communications device according to any of Paragraphs 6 to 12, wherein the second signal is a random access response message received by the communications device from the infrastructure equipment as part of the random access procedure.

Paragraph 14. A communications device according to Paragraph 13, wherein the parameter of the second signal is a number of repetitions of a physical channel carrying the random access response message transmitted by the infrastructure equipment.

Paragraph 15. A communications device according to Paragraph 13 or Paragraph 14, wherein the parameter of the second signal is an MCS in accordance with which the random access response message is transmitted by the infrastructure equipment.

Paragraph 16. A communications device according to any of Paragraphs 1 to 15, wherein the at least one bit is a single bit.

Paragraph 17. A communications device according to any of Paragraphs 1 to 16, wherein the at least one bit is two or more bits.

Paragraph 18. A communications device according to any of Paragraphs 2 to 17, wherein the communications device is configured to receive, from the infrastructure equipment, an indication of a mapping between the at least one bit of the first signal, the parameter of the second signal, and the transport format of the third signal via RRC signalling.

Paragraph 19. A communications device according to any of Paragraphs 2 to 18, wherein the communications device is configured to perform a random access procedure to connect to the wireless communications network, and wherein the communications device is configured to receive a dynamic indication of a mapping between the at least one bit of the first signal, the parameter of the second signal, and the transport format of the third signal in a random access response message received by the communications device from the infrastructure equipment as part of the random access procedure.

Paragraph 20. A communications device according to any of Paragraphs 2 to 19, wherein the communications device is configured to receive, from the infrastructure equipment, a dynamic indication of a mapping between the at least one bit of the first signal, the parameter of the second signal, and the transport format of the third signal as Downlink Control Information, DCI.

Paragraph 21. A communications device according to any of Paragraphs 2 to 20, wherein a mapping between the at least one bit of the first signal, the parameter of the second signal, and the transport format of the third signal is fixed and predefined, and known by the communications device.

Paragraph 22. A method of operating a communications device for transmitting data to or receiving data from an infrastructure equipment forming part of a wireless communications network, the method comprising
  determining that the communications device is to send an indication of quality information to the infrastructure equipment, the quality information indicating a relative quality of signals received by the communications device,
  performing measurements on one or more signals received by the communications device from the infrastructure equipment via a wireless access interface provided by the wireless communications network,
  encoding the indication of quality information, based on the performed measurements, using at least one bit of a first signal in combination with a parameter of a second signal, and
  transmitting the first signal to the infrastructure equipment via the wireless access interface.

Paragraph 23. Circuitry for a communications device for transmitting data to or receiving data from an infrastructure equipment forming part of a wireless communications network, the communications device comprising
  transmitter circuitry configured to transmit signals to the infrastructure equipment via a wireless access interface provided by the wireless communications network,
  receiver circuitry configured to receive signals from the infrastructure equipment via the wireless access interface, and
  controller circuitry configured in combination with the receiver circuitry and the transmitter circuitry
  to determine that the communications device is to send an indication of quality information to the infrastructure equipment, the quality information indicating a relative quality of signals received by the communications device,
  to perform measurements on one or more signals received by the communications device from the infrastructure equipment,
  to encode the indication of quality information, based on the performed measurements, using at least one bit of a first signal in combination with a parameter of a second signal, and
  to transmit the first signal to the infrastructure equipment.

Paragraph 24. An infrastructure equipment forming part of a wireless communications network for transmitting data to or receiving data from a communications device, the infrastructure equipment comprising
  transmitter circuitry configured to transmit signals to the communications device via a wireless access interface provided by the wireless communications network,
  receiver circuitry configured to receive signals from the communications device via the wireless access interface, and
  controller circuitry configured in combination with the receiver circuitry and the transmitter circuitry
  to receive a first signal from the communications device, and
  to determine, based on at least one bit of the first signal in combination with a parameter of a second signal, an indication of quality information, the quality information indicating a relative quality of signals received by the communications device.

Paragraph 25. An infrastructure equipment according to Paragraph 24, wherein the infrastructure equipment is configured to transmit a third signal to the communications device, the third signal being transmitted by the infrastructure equipment in accordance with a transport format defining values of one or more communications parameters with which the third signal should be transmitted and having been selected from among a plurality of transport formats dependent on the indication of quality information.

Paragraph 26. An infrastructure equipment according to Paragraph 25, wherein the one or more communications parameters having values which are defined by the plurality of transport formats and with which the third signal should be transmitted comprise at least one of a modulation scheme to be applied to the third signal, a coding rate to be applied to the third signal, and a number of repetitions of the third signal.

Paragraph 27. An infrastructure equipment according to any of Paragraphs 24 to 26, wherein the first signal comprises a Medium Access Control, MAC, control element.

Paragraph 28. An infrastructure equipment according to any of Paragraphs 24 to 27, wherein the infrastructure equipment is configured to transmit an instruction to the communications device indicating that the communications device is to send the indication of quality information to the infrastructure equipment.

Paragraph 29. An infrastructure equipment according to any of Paragraphs 24 to 28, wherein the infrastructure equipment is configured to perform a random access procedure initiated by the communications device for the communications device to connect to the wireless communications network, and wherein the infrastructure equipment is configured to receive the indication of quality information from the communications device as part of the random access procedure.

Paragraph 30. An infrastructure equipment according to Paragraph 29, wherein the first signal is a Radio Resource Control RRC, signal received by the infrastructure equipment from the communications device as part of the random access procedure.

Paragraph 31. An infrastructure equipment according to Paragraph 29 or Paragraph 30, wherein the second signal is a Physical Random Access Channel, PRACH, received by the infrastructure equipment from the communications device as part of the random access procedure.

Paragraph 32. An infrastructure equipment according to Paragraph 31, wherein the parameter of the second signal is a coverage enhancement, CE, level of the PRACH.

Paragraph 33. An infrastructure equipment according to any of Paragraphs 29 to 32, wherein the second signal is a control channel transmitted by the infrastructure equipment to the communications device as part of the random access procedure, the control channel comprising an indication of a communications resource allocation for a random access response message.

Paragraph 34. An infrastructure equipment according to Paragraph 33, wherein the parameter of the second signal is a number of repetitions of the control channel transmitted by the infrastructure equipment.

Paragraph 35. An infrastructure equipment according to Paragraph 33 or Paragraph 34, wherein the parameter of the second signal is a modulation and coding scheme, MCS, in accordance with which the control channel is transmitted by the infrastructure equipment.

Paragraph 36. An infrastructure equipment according to any of Paragraphs 29 to 32, wherein the second signal is a random access response message transmitted by the infrastructure equipment to the communications device as part of the random access procedure.

Paragraph 37. An infrastructure equipment according to Paragraph 36, wherein the parameter of the second signal is a number of repetitions of a physical channel carrying the random access response message transmitted by the infrastructure equipment.

Paragraph 38. An infrastructure equipment according to Paragraph 36 or Paragraph 37, wherein the parameter of the second signal is an MCS in accordance with which the random access response message is transmitted by the infrastructure equipment.

Paragraph 39. An infrastructure equipment according to any of Paragraphs 24 to 38, wherein the at least one bit is a single bit.

Paragraph 40. An infrastructure equipment according to any of Paragraphs 24 to 39, wherein the at least one bit is two or more bits.

Paragraph 41. An infrastructure equipment according to any of Paragraphs 25 to 40, wherein the infrastructure equipment is configured to transmit, to the communications device, an indication of a mapping between the at least one bit of the first signal, the parameter of the second signal, and the transport format of the third signal via RRC signalling.

Paragraph 42. An infrastructure equipment according to any of Paragraphs 25 to 41, wherein the infrastructure equipment is configured to perform a random access procedure initiated by the communications device for the communications device to connect to the wireless communications network, and wherein the infrastructure equipment is configured to transmit a dynamic indication of a mapping between the at least one bit of the first signal, the parameter of the second signal, and the transport format of the third signal in a random access response message transmitted by the infrastructure equipment to the communications device as part of the random access procedure.

Paragraph 43. An infrastructure equipment according to any of Paragraphs 25 to 42, wherein the infrastructure equipment is configured to transmit, to the communications device, a dynamic indication of a mapping between the at least one bit of the first signal, the parameter of the second signal, and the transport format of the third signal as Downlink Control Information, DCI.

Paragraph 44. A method of operating an infrastructure equipment forming part of a wireless communications network for transmitting data to or receiving data from a communications device, the method comprising
  receiving, via a wireless access interface provided by the wireless communications network, a first signal from the communications device, and
  determining, based on at least one bit of the first signal in combination with a parameter of a second signal, an indication of quality information, the quality information indicating a relative quality of signals received by the communications device.

Paragraph 45. Circuitry for an infrastructure equipment forming part of a wireless communications network for transmitting data to or receiving data from a communications device, the infrastructure equipment comprising
  transmitter circuitry configured to transmit signals to the communications device via a wireless access interface provided by the wireless communications network,
  receiver circuitry configured to receive signals from the communications device via the wireless access interface, and
  controller circuitry configured in combination with the receiver circuitry and the transmitter circuitry
  to receive a first signal from the communications device, and
to determine, based on at least one bit of the first signal in combination with a parameter of a second signal, an indication of quality information, the quality information indicating a relative quality of signals received by the communications device.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] RP-181878, "Revised WID: Additional MTC enhancements for LTE," Ericsson, 3GPP TSG RAN Meeting #81, Gold Coast, Australia, Sep. 10-13, 2018.
[6] RP-181451, "New WID on Rel-16 enhancements for NB-IoT," Ericsson, Huawei, 3GPP TSG RAN Meeting #80, La Jolla, USA, Jun. 11-14, 2018.
[7] Holma H. and Toskala A, "LTE for UMTS OFDMA and SC-FDMA based radio access", John Wiley and Sons, 2009.
[8] RP-172834, "Revised WID on New Radio Access Technology," NTT DOCOMO, RAN#78.
[9] ETSI TS 136 213 V13.0.0 (2016-01)/3GPP TS 36.212 version 13.0.0 Release 13.

What is claimed is:

1. A communications device for transmitting data to or receiving data from an infrastructure equipment forming part of a wireless communications network, the communications device comprising:
transmitter circuitry configured to transmit signals to the infrastructure equipment via a wireless access interface provided by the wireless communications network,
receiver circuitry configured to receive signals from the infrastructure equipment via the wireless access interface, and
controller circuitry configured, in combination with the receiver circuitry and the transmitter circuitry, to:
determine that the communications device is to send an indication of quality information to the infrastructure equipment, the quality information indicating a relative quality of signals received by the communications device,
perform measurements on one or more signals received by the communications device from the infrastructure equipment,
encode the indication of quality information, based on the performed measurements, using a parameter of a second signal in combination with at least one bit of a first signal that is different from the second signal, and
transmit the first signal and the second signal to the infrastructure equipment.

2. The communications device according to claim 1, wherein the communications device is configured to receive a third signal from the infrastructure equipment, the third signal being transmitted by the infrastructure equipment in accordance with a transport format defining values of one or more communications parameters with which the third signal should be transmitted and having been selected from among a plurality of transport formats dependent on the indication of quality information.

3. The communications device according to claim 2, wherein the one or more communications parameters having values which are defined by the plurality of transport formats and with which the third signal should be transmitted comprise at least one of a modulation scheme to be applied to the third signal, a coding rate to be applied to the third signal, and a number of repetitions of the third signal.

4. The communications device according to claim 1, wherein the first signal comprises a Medium Access Control (MAC) control element.

5. The communications device according to claim 1, wherein the communications device is configured to determine that the communications device is to send the indication of quality information to the infrastructure equipment by receiving an instruction from the infrastructure equipment to send the indication of quality information.

6. The communications device according to claim 1, wherein the communications device is configured to perform a random access procedure to connect to the wireless communications network, and wherein the communications device is configured to determine that the communications device is to send the indication of quality information to the infrastructure equipment as part of the random access procedure.

7. The communications device according to claim 6, wherein the first signal is a Radio Resource Control (RRC) signal transmitted by the communications device to the infrastructure equipment as part of the random access procedure.

8. The communications device according to claim 6, wherein the second signal is a Physical Random Access Channel (PRACH) transmitted by the communications device to the infrastructure equipment as part of the random access procedure.

9. The communications device according to claim 8, wherein the parameter of the second signal is a coverage enhancement (CE) level of the PRACH.

10. The communications device according to claim 6, wherein the second signal is a control channel received by the communications device from the infrastructure equipment as part of the random access procedure, the control channel comprising an indication of a communications resource allocation for a random access response message.

11. The communications device according to claim 10, wherein the parameter of the second signal is a number of repetitions of the control channel transmitted by the infrastructure equipment.

12. The communications device according to claim 10, wherein the parameter of the second signal is a modulation and coding scheme (MCS) in accordance with which the control channel is transmitted by the infrastructure equipment.

13. The communications device according to claim 6, wherein the second signal is a random access response message received by the communications device from the infrastructure equipment as part of the random access procedure.

14. The communications device according to claim 13, wherein the parameter of the second signal is a number of repetitions of a physical channel carrying the random access response message transmitted by the infrastructure equipment.

15. The communications device according to claim 13, wherein the parameter of the second signal is a modulation and coding scheme (MCS) in accordance with which the random access response message is transmitted by the infrastructure equipment.

16. The communications device according to claim 1, wherein the at least one bit is a single bit.

17. The communications device according to claim 1, wherein the at least one bit is two or more bits.

18. The communications device according to claim 2, wherein the communications device is configured to receive, from the infrastructure equipment, an indication of a mapping between the at least one bit of the first signal, the parameter of the second signal, and the transport format of the third signal via radio resource control (RRC) signaling.

19. A method of operating a communications device for transmitting data to or receiving data from an infrastructure equipment forming part of a wireless communications network, the method comprising:
- determining that the communications device is to send an indication of quality information to the infrastructure equipment, the quality information indicating a relative quality of signals received by the communications device,
- performing measurements on one or more signals received by the communications device from the infrastructure equipment via a wireless access interface provided by the wireless communications network,
- encoding the indication of quality information, based on the performed measurements, using a parameter of a second signal in combination with at least one bit of a first signal that is different from the second signal, and
- transmitting the first signal and second signal to the infrastructure equipment via the wireless access interface.

20. A circuitry for an infrastructure equipment forming part of a wireless communications network for transmitting data to or receiving data from a communications device, the infrastructure equipment comprising:
- transmitter circuitry configured to transmit signals to the communications device via a wireless access interface provided by the wireless communications network,
- receiver circuitry configured to receive signals from the communications device via the wireless access interface, and
- controller circuitry configured in combination with the receiver circuitry and the transmitter circuitry to:
  - receive a first signal and a second signal from the communications device, and
  - determine, based on a parameter of the second signal in combination with at least one bit of a first signal that is different from the second signal, an encoding of an indication of quality information, the quality information indicating a relative quality of signals received by the communications device.

* * * * *